United States Patent [19]

Tanaka et al.

[11] Patent Number: 4,969,161
[45] Date of Patent: Nov. 6, 1990

[54] APPARATUS FOR INPUTTING AND OUTPUTTING DATA

[75] Inventors: Toshimasa Tanaka; Tetsuji Yamashita, both of Kanagawa, Japan

[73] Assignee: Kabushiki Kaisha Toshiba, Kawasaki, Japan

[21] Appl. No.: 221,355

[22] Filed: Jul. 19, 1988

[30] Foreign Application Priority Data

Sep. 7, 1987 [JP] Japan .................. 62-222139

[51] Int. Cl.$^5$ ............................ H04L 25/02
[52] U.S. Cl. ........................... 375/7; 375/36; 370/85.1
[58] Field of Search .............. 375/7, 36; 370/85, 85.1, 370/32; 455/58, 117; 340/825.16; 178/69 B, 69 R, 69 G

[56] References Cited

U.S. PATENT DOCUMENTS

| | | | |
|---|---|---|---|
| 3,609,692 | 9/1971 | Blake | 375/7 |
| 4,447,813 | 5/1984 | O'Pray | 370/85.1 |
| 4,482,948 | 11/1984 | Holden | 364/200 |
| 4,685,113 | 8/1987 | Hono et al. | 375/36 |
| 4,697,047 | 9/1987 | Hirai et al. | 178/69 B |
| 4,756,006 | 7/1988 | Rickard | 375/7 |
| 4,785,465 | 11/1988 | Lang et al. | 375/7 |

OTHER PUBLICATIONS 2114A 1024×4 Bit Static Ram; Intel Memory Components Handbook; Intel Corporation 1985; Order No. 210830-004; p. No. 3-1.

George Alexy, Microcomputer Applications, INTEL, AP-67, Oct. 1986, pp. 2-368-2-377.

Primary Examiner—Douglas W. Olms
Assistant Examiner—Stephen Chin
Attorney, Agent, or Firm—Foley & Lardner, Schwartz, Jeffery, Schwaab, Mack, Blumenthal & Evans

[57] ABSTRACT

An apparatus for inputting and outputtting data comprises an output section for outputting data to a data bus at a predetermined output timing; an input section for inputting the data transmitted through the data bus at a predetermined input timing; an output timing setting section releasing the reset thereof based on a first control signal and operated based on a second control signal and setting the output timing; and an input timing setting section releasing the reset thereof based on the second control signal and operated based on the first control signal and setting the input timing.

10 Claims, 4 Drawing Sheets

APPARATUS FOR INPUTTING AND OUTPUTTING DATA

The present invention relates to an apparatus for inputting and outputting data between microcomputers, etc. embedded in electronic circuits, integrated circuits, etc., and in particular, to an apparatus for inputting and outputting data for a so-called sequential access system for accessing data in the order of address based on a preset sequence.

BACKGROUND OF THE INVENTION

Recently, various kinds of integrated circuits or electronic circuits, etc. with microcomputers embedded therein have been developed. In such integrated circuits or electronic circuits embedding microcomputers therein, it is necessary to dispose an apparatus for inputting and outputting data to transmit data between the microcomputers.

FIG. 1 is a block view showing such a conventional apparatus for inputting and outputting data. FIG. 2 is a view showing waveforms of signals of respective portions of FIG. 1.

As shown by FIGS. 1 and 2, an outputting section 2 is an outputting means for outputting data D1 and D2 of transmitting paths L1 and L2 to respective data buses DB at a predetermined output timing. The output timing of the output section 2 is decided by a counter circuit 3 and gate circuits 9 and 10. Namely, a reset signal RS and a clock signal CL are respectively provided for the counter circuit 3. The counter circuit 3 starts the counting operation based on the reset signal RS and the clock signal CL, operating the output section 2 based on the counting output of the counting circuit 3. At this time, the gate circuits 9 and 10 receive a direction control signal DC at L (low voltage) level, and data D1 and D2 from the output section 2 are outputted to the data buses DB only in a period during which the direction control signal DC is at the L level.

When the direction control signal DC is set at H(high voltage) level, the respective output sides of the gate circuits 9 and 10 are set to a high impedance state, the data D3 and D4 transmitted through the data buses DB are inputted to an input section 11. The input section 11 carries out the distribution of data D3 and D4 based on the counting output from the counter circuit 3 mentioned above. Namely, data D3 are transmitted to a transmitting path L3 through a data register 11a, and data D4 is transmitted to a transmitting path L4 through a data register 11b.

However, in the conventional example shown in FIG. 1, it is necessary to provide the reset signal RS and the clock signal CL for driving the counter circuit 3, and to provide the direction control signal DC for controlling the gate circuits 9 and 10. Therefore, it has been desired that the number of signal lines for control is reduced as small as possible, in particular, in electronic circuits, etc. in which the number of IO(input and output) ports is limited.

SUMMARY OF THE INVENTION

To overcome the problems mentioned above, an object of the present invention is to provide an apparatus for inputting and outputting data reliably without malfunction by noises, etc. and reducing the number of signal lines for control as small as possible.

With the above object in mind, the present invention resides in an apparatus for inputting and outputting data, comprising means for outputting data to a data bus at a predetermined output timing; means for inputting the data transmitted through the data bus at a predetermined input timing; output timing setting means releasing the reset thereof based on a first control signal and operated based on a second control signal and setting said output timing; and input timing setting means releasing the reset thereof based on the second control signal and operated based on the first control signal and setting said input timing.

In the present invention, with respect to the output timing of the data, the output timing setting means releases the resetting state thereof based on the first control signal, and is operated based on the second control signal. With respect to the input timing of the data, the input timing setting means releases the resetting state thereof based on the second control signal, and is operated based on the first control signal. Accordingly, the data are outputted to the data bus based on the outputting timing set by the output timing setting means, and the data transmitted through the data bus are inputted to the input means based on the input timing set by the input timing setting means.

BRIEF DESCRIPTION OF THE DRAWINGS

The present invention will be more apparent from the following description of the preferred embodiments thereof in conjunction with the accompanying drawings in which.

DETAILED DESCRIPTION OF THE PREFERRED EMBODIMENTS

The preferred embodiments of the present invention will now be described in detail with reference to the accompanying drawings.

Figure 1:
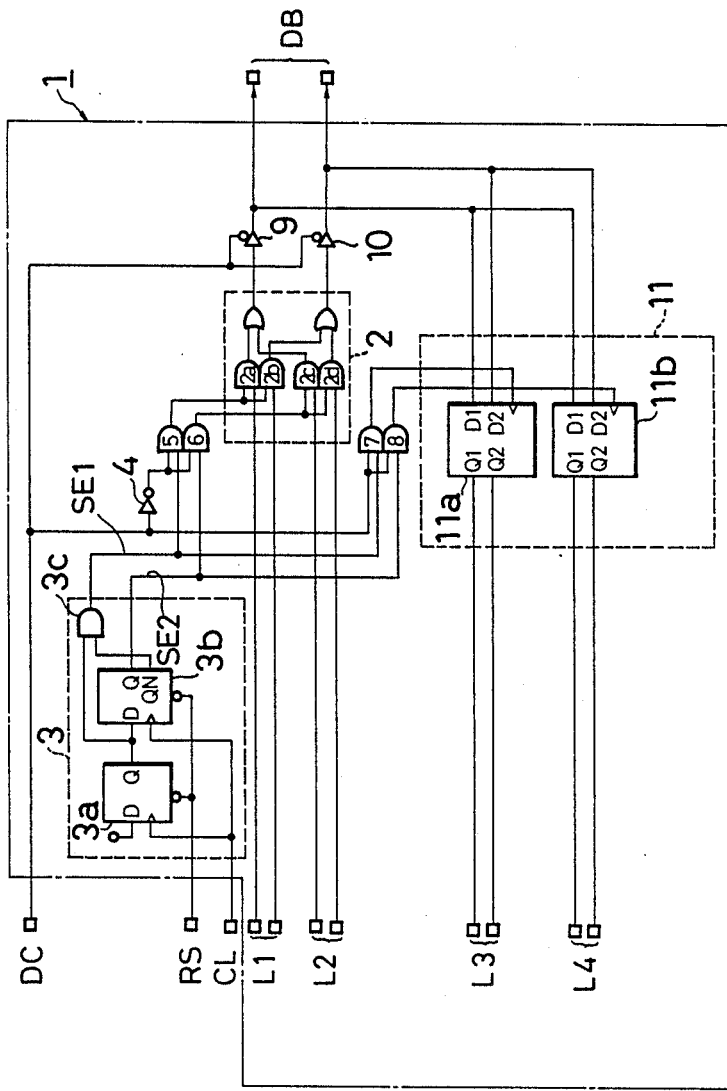
FIG. 1 is a block view showing a conventional apparatus for inputting and outputting data.
Figure 2:
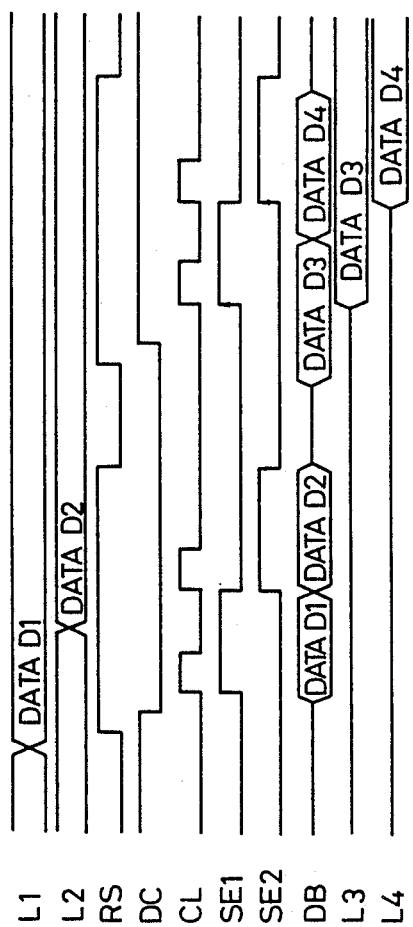
FIG. 2 is a view showing waveforms of signals of respective portions of FIG. 1.
Figure 3:
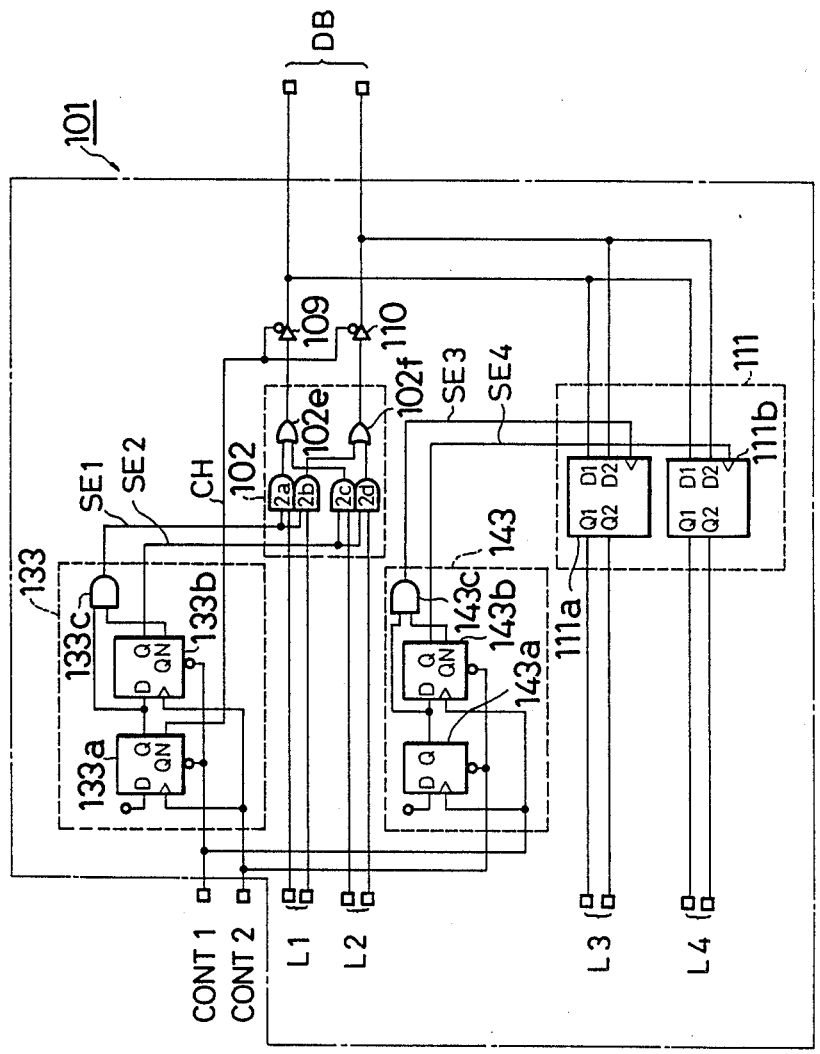
FIG. 3 is a block view showing one embodiment of the data input-output apparatus of the present invention.

FIG. 3 is a block view showing one embodiment of data input-output apparatus of the present invention. A data input-output apparatus 101 inputs and outputs data between microcomputers embedded in electronic circuits, etc. In the input and output of the data, respective timings thereof are preset, and the data are inputted and outputted by the so-called sequential access system for accessing the data in the order of address based on the preset sequence. The data input-output apparatus 101 receives a control signal CONT1 as a first control signal and a control signal CONT2 as a second control signal. The control signals CONT1 and CONT2 are supplied to a microcomputer for processing the control signals CONT1 and CONT2 at a predetermined timing. Data D1 is transmitted through the transmitting path L1, and data D2 is transmitted through the transmitting path L2. These data D1 and D2 are respectively supplied to a data bus DB based on an output timing described later. The data bus DB is connected to an unillustrated microcomputer. The data D3 and D4 transmitted through data bus DB are inputted to the data input-output apparatus 101 at a predetermined timing. The data D3 inputted at the predetermined timing is supplied to a transmitting path L3, and the data D4 is supplied to a transmitting path L4.

The internal construction of the data input-output apparatus 101 will now be described in detail.

An output section 102 is an output means for respectively outputting data D1 and D2 to the data bus DB at a predetermined output timing, and is constituted by four logic product circuits 102a, 102b, 102c and 102d, and two logic sum circuits 102e and 102f. An input section 111 is an input means for respectively inputting data D3 and D4 transmitted through the data bus DB at a predetermined input timing, and is constituted by data registers 111a and 111b. A counter 133 releases the reset state thereof based on the signal CONT1 as the first control signal, and is operated based on the control signal CONT2 as the second control signal, and constitutes an output timing setting means for setting the output timing mentioned before. The counter circuit 133 as the output timing setting means is constituted by flipflop circuits 133a and 133b, and a logic product circuit 133c. Further, a counter circuit 143 releases the resetting state thereof based on the control signal CONT2 as the second control signal, and is operated based on the control signal CONT1 as the first control signal, and constitutes an input timing setting means for setting the input timing mentioned before. The counter circuit 143 as the input timing setting means is constituted by flipflop circuits 143a and 143b, and a logic product circuit 143c. The gate circuits 109 and 110 are controlled based on an input-output switching signal CH for switching the input and output of the data. Namely, when the input-output switching signal CH is set at L(low voltage) level, the data D1 and D2 from the output section 102 are supplied to the date bus DB. On the other hand, when the input-output switching signal CH is set at H(high voltage) level, the respective output sides of the gate circuits 109 and 110 are set to a high impedance state so that the data D3 and D4 transmitted through the data bus DB are inputted to the input section 111.

Figure 4:
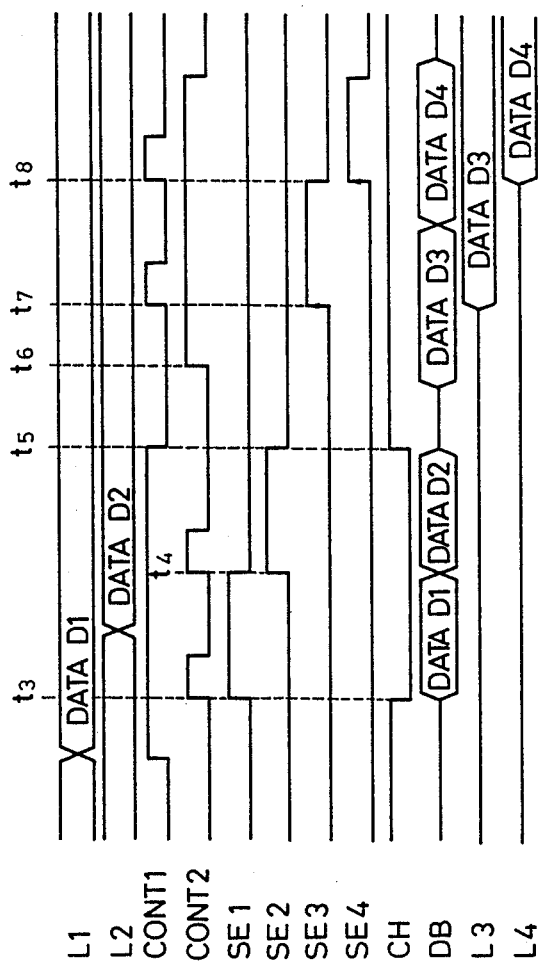
FIG. 4 is a view showing waveforms of signals of respective portions of FIG. 3.

FIG. 4 is a view showing waveforms of signals of respective portions in the embodiment of the present invention shown in FIG. 3.

The operation of the apparatus of the present invention will now be described with reference to FIG. 4.

When the control signals CONT1 and CONT2 are respectively set to L level, the L level is supplied to respective reset terminals of flipflop circuits 133a, 133b and 143a, 143b, and the respective flipflop circuits 133a, 133b and 143a and 143b are reset, thereby initially setting the corresponding counter circuits 133 and 143. When the control signal CONT1 rises to H level, the resetting state of the flipflop circuits 133a and 133b is released, thereby setting the counter circuit 133 to an operable state. Subsequently, when the control signal CONT2 rises to H level at time t3, the flipflop circuit 133a is inverted, and the H level is outputted to one input terminal of the logic product circuit 133c so that a select signal SE1 at H level is outputted from the logic product circuit 133c. Simultaneously, by the inversion of the flipflop circuit 133a at time t3, the input-output switching signal CH is set to L level. When the select signal SE1 is set to H level as mentioned before, the select signal SE1 at H level is supplied to the respective input terminals of the logic product circuits 102a and 102b, and data D1 from the transmitting path L1 is outputted to the data bus DB through logic product circuits 102a, 102b, and logic sum circuits 102e and 102f, and the gate circuits 109 and 110.

Subsequently, when the control signal CONT2 again rises to H level at time t4, the select signal SE1 is set to L level, and the flipflop circuit 133b is inverted, thereby rising the select signal SE2 to H level. The select signal SE2 at H level is supplied to the respective input terminals of the logic product circuits 102c and 102d. Accordingly, the data D2 from the transmitting path L2 are supplied to the data bus DB through the logic product circuits 102c, 102d, the logic sum circuits 102e, and 102f, and the gate circuits 109 and 110.

Subsequently, when the control signal CONT1 is set to L level at time t5, the flipflop circuits 133a and 133b are reset, and the counter circuit 133 is initially set, and the select signals SE1 and SE2 are respectively initially set.

To output the data again to the data bus DB in such a state, the above operation is repeated since the counter circuit 133 and the select signals SE1 and SE2 are respectively initially set, thereby supplying the respective data from the transmitting paths L1 and L2 to the data bus DB.

Subsequently, when the control signal CONT2 rises to H level at time t6, the control signal CONT2 at H level is supplied to the respective reset terminals of the flipflop circuits 143a and 143b, and the resetting state of the flipflop circuits 143a and 143b is released, thereby setting the counter circuit 143 to an operable state. Next, when the control signal CONT1 rises to H level at time t7, the flipflop circuit 143a is inverted, and the H level is transmitted to one input terminal of the logic product circuit 143c. Thus, the logic product circuit 143c supplies a select signal SE3 at H level to the data register 111a. Since the input-output switching signal CH is set to H level in this state, the respective output sides of the gate circuits 109 and 110 are set to a high impedance state, thereby inputting the data D3 from the data bus DB to the data register 111a. The data D3 from the data bus DB is supplied to the transmitting path L3 in synchronization with the rise timing of the H level of the select signal SE3 mentioned before. Subsequently, when the control signal CONT1 rises from L level to H level at time t8, the select signal SE3 falls to L level, and the flipflop circuit 143b is inverted, thereby rising the select signal SE4 to H level. When the select signal SE4 at H level is outputted to the data register 111b, the data D4 from the data bus DB is transmitted to the transmitting path L4 in synchronization with the rise timing to the H level of the select signal SE4.

In the embodiment shown in FIG. 3 mentioned above, a period for setting L level with respect to control signals CONT1 and CONT2 is provided. For example, in the period from time t5 to time t6, the control signals CONT1 and CONT2 are set to L level, thereby initially setting the counter circuits 133 and 143. In such a state, the malfunction of the counter circuits 133 and 143 are reliably prevented even when pulse-shaped noise is inputted to the respective clock terminals of the flipflop circuits 133a, 133b, 143a and 143b.

In the embodiment shown by FIG. 3, two data registers 111a and 111b are provided as the input section 111, but the present invention is not limited to this case, and may be constituted to provide a suitable number of data registers.

In the above embodiment, the data registers 111a and 111b are operated based on the rise timing of the control signal CONT1, but may be operated at the fall timing of the control signal CONT1 as well as the rise timing of the control signal CONT1, thereby further increasing the transmitting speed of the data.

As mentioned above, in accordance with the construction of the present invention, an output timing setting means for setting an output timing releases the resetting state thereof based on a first control signal, and is operated by a second control signal. An input timing setting means for setting an input timing releases the resetting state thereof based on the second control signal, and is operated based on the first control signal. Accordingly, the data can be reliably inputted and outputted by two kinds of control signals.

Further, even when pulse-shaped noise is generated, the malfunction of a counter circuit can be reliably prevented, further improving the reliability of the apparatus for inputting and outputting the data.

What is claimed is:

1. An apparatus for inputting and outputting data, comprising:
    means for outputting data to a data bus at a predetermined output timing;
    means for inputting the data transmitted through the data bus at a predetermined input timing;
    output timing setting means releasing the reset thereof based on a first control signal and operated based on a second control signal and setting said output timing; and
    input timing setting means releasing the reset thereof based on said second control signal and operated based on said first control signal and setting said input timing.

2. An apparatus for inputting and outputting data, as claimed in claim 1, wherein said output timing setting means comprises a counter.

3. An apparatus for inputting and outputting data, as claimed in claim 2, wherein said counter comprises a flipflop circuit and a logic product circuit.

4. An apparatus for inputting and outputting data, as claimed in claim 1, wherein said input timing setting means comprises a counter.

5. An apparatus for inputting and outputting data, as claimed in claim 4, wherein said counter comprises a flipflop circuit and a logic product circuit.

6. An apparatus for inputting and outputting data, as claimed in claim 1, wherein said output means comprises a logic product circuit and a logic sum circuit.

7. An apparatus for inputting and outputting data, as claimed in claim 1, wherein said means for inputting comprises a data register.

8. An apparatus for inputting and outputting data, as claimed in claim 1, wherein a gate circuit controlled based on a switching signal is disposed for switching the input and output of the data.

9. An apparatus for inputting first data (D3,D4) and outputting second data (D1,D2) relative to a data bus, comprising:
    means for providing a first control signal (CONT 1);
    means for providing a second control signal (CONT 2);
    output timing setting means (133) having a reset releasable in response to said first control signal (CONT 1) and operating in response to said second control signal (CONT 2) to set output timing (CH, SE1, SE2);
    input timing setting means (143) having a reset releasable in response to said second control signal (CONT 2) and operating in response to said first control signal (CONT 1) to set input timing (SE3, SE4);
    means for outputting (102, 109, 110) said second data (D1, D2) to said data bus (DB) in response to said output timing (CH, SE1, SE2); and
    means for inputting (111) said first data (D3, D4) from said data bus (DB) in response to said input timing (SE3, SE4).

10. An apparatus for outputting first data (D1, D2) to a bidirectional data bus (DB) and for inputting second data (D3, D4) from said bus (DB) comprising:
    output (133) and input (143) timing setting means each exhibiting a reset state and a timing output state and each having a reset input means controlling said reset state and a timing input means controlling said timing output state;
    first means for providing a first control signal (CONT 1) to said reset input means of said output timing setting means (133) and to said timing input means of said input timing setting means (143);
    second means for providing a second control signal (CONT 2) to said reset input means of said input timing setting means (143) and to said timing input means of said output timing setting means (133);
    controlled output means (102, 109, 110) for outputting said first data (D1, D2) to said bus (DB) in response to said timing output state (CH, SE1, SE2) of said output timing setting means (133); and
    controlled input means (111) for inputting said second data (D3,D4) from said bus (DB) in response to said timing output state (SE3,SE4) of said input timing setting means (143).

* * * * *